United States Patent
Wu et al.

(10) Patent No.: US 10,467,290 B1
(45) Date of Patent: Nov. 5, 2019

(54) GENERATING AND REFINING A KNOWLEDGE GRAPH

(71) Applicant: Amazon Technologies, Inc., Seattle, WA (US)

(72) Inventors: Weixin Wu, Seattle, WA (US); Wei Xia, Seattle, WA (US); Ranju Das, Seattle, WA (US); Meng Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 458 days.

(21) Appl. No.: 14/982,816

(22) Filed: Dec. 29, 2015

(51) Int. Cl.
*G06F 16/901* (2019.01)
*G06F 16/58* (2019.01)

(52) U.S. Cl.
CPC ...... *G06F 16/9024* (2019.01); *G06F 16/5866* (2019.01)

(58) Field of Classification Search
USPC ........................................ 707/609
See application file for complete search history.

(56) References Cited

U.S. PATENT DOCUMENTS

| | | | | |
|---|---|---|---|---|
| 5,787,422 A | * | 7/1998 | Tukey | G06F 17/30707 |
| 2011/0161073 A1 | * | 6/2011 | Lesher | G06F 17/2795 704/10 |
| 2012/0310944 A1 | * | 12/2012 | Mizuguchi | G06F 17/2735 707/740 |
| 2013/0226865 A1 | * | 8/2013 | Munemann | G06F 17/30864 707/609 |
| 2015/0066477 A1 | * | 3/2015 | Hu | G06F 17/271 704/9 |

* cited by examiner

*Primary Examiner* — Muluemebet Gurmu
(74) *Attorney, Agent, or Firm* — Lee & Hayes, P.C.

(57) ABSTRACT

A knowledge graph (KG) is generated and refined. The generated KG describes direct relationships between different words associated with a particular classification. Initially, a semantic data source, such as a lexical database, is accessed to identify words that are similarly grouped and express a distinct concept. A KG generator creates a sparse KG that provides a direct connection between a seed word and other words. The sparse KG is used by a dense KG generator to create a dense KG. The dense KG generator creates a dense KG that joins each of the different words directly with the seed word for the category. At different points during the creation and refinement of the KG, a user may add or remove one or more connections that affect the creation of the KG.

14 Claims, 7 Drawing Sheets

GENERATING AND REFINING A KNOWLEDGE GRAPH

BACKGROUND

While smartphones have revolutionized the taking of images, in both content and quantity, the way those images are managed and organized has hardly kept pace. Users have collected thousands of moments and memories, yet these images are typically just saved to random, disorganized "albums" on smartphones, on social media or in cloud storage. This scattered and disorganized system has made it difficult to find and look back at old images. While images may be "tagged" with keywords in order to help identify images that include the same object, it may be difficult for a user to identify the images that include similar objects that are not tagged in the same manner. Further, while different techniques, such as Deep Learning, may be utilized as a classification tool, these techniques may not perform well as the number of words associated with a category grows. For example, as the semantics between words (or classes, used interchangeably below) starts to merge with each other, these different words or classes may overlap with one another. Thus, two different classes that are semantically similar, become more difficult and inefficient to classify, due to competition. As an example, the same object within an image that is at a slightly different angle or having a slightly different lighting condition may be recognized as a competing class. As such, the same object may be classified under two different classes.

DETAILED DESCRIPTION

Figure 1:
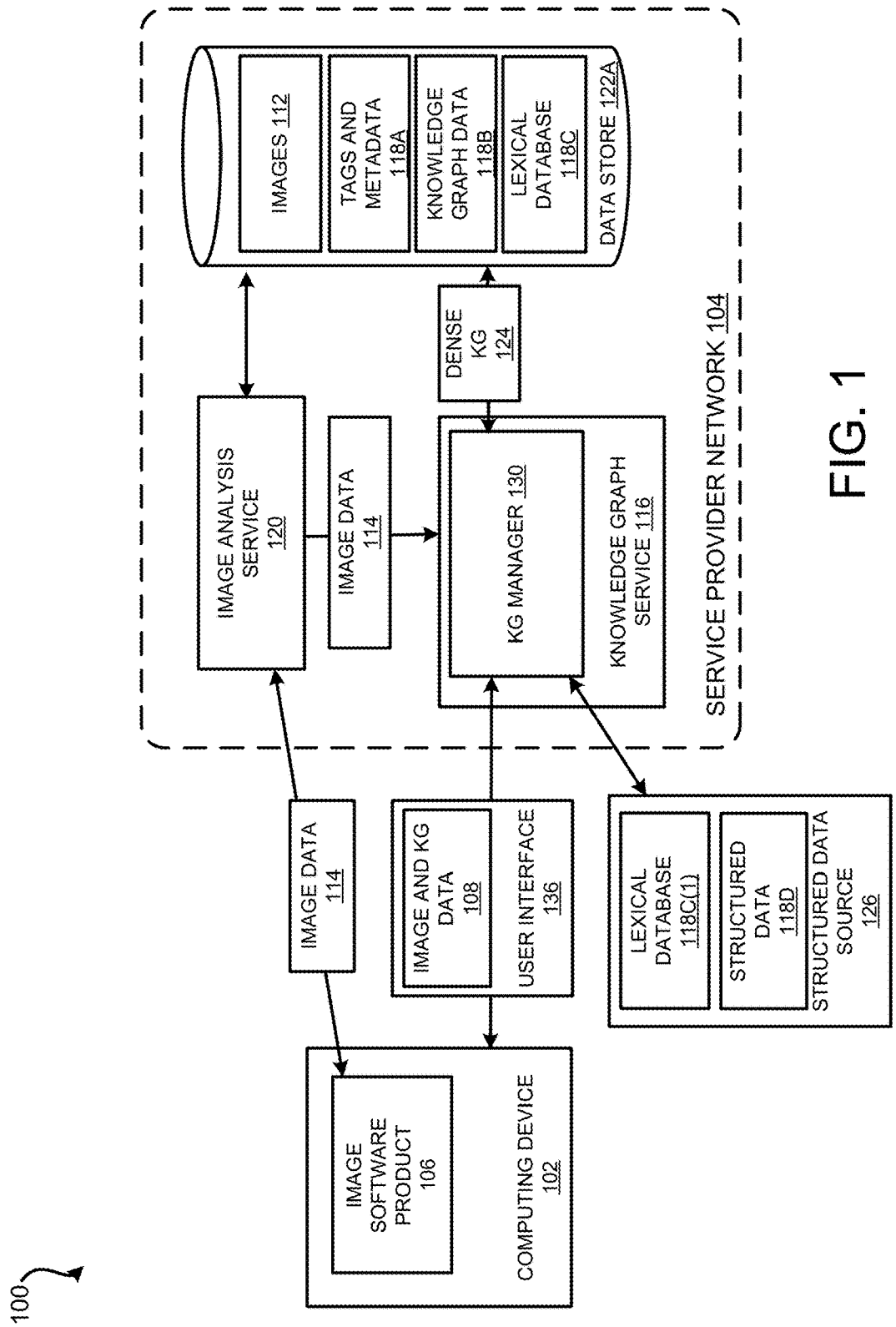
FIG. 1 is a block diagram depicting an illustrative operating environment in which a knowledge graph is generated and used with tagged images of a user.

The following detailed description is directed to technologies for generating and refining a knowledge graph. Using techniques described herein, a Knowledge Graph (KG) may be generated to help in classifying objects identified in images. In a KG, a class can either be an ancestor, a descendent, a synonym or irrelevant to another class, semantically or by its training content. According to some configurations, a dense KG is iteratively constructed for a given numbers of classes and their training image(s). As described in more detail below, a dense KG identifies direct connections between the root node and each of the children nodes. In some configurations, the KG is generated from a single seed word or class.

According to some configurations, a semantic data source (e.g., WORDNET, FREEBASE, DBPEDIA, BABELNET), is initially accessed to identify words that are similarly grouped and express a distinct concept (e.g., "related words"). For example, a lexical database (e.g., WORDNET), is accessed to determine related words to a seed word for the category. In some configurations, the data source may identify different "senses" for the same word. For example, the word "jaguar" may be identified as an animal according to one sense, and as a car according to another sense. As another example, the word "puppy" may be identified as an animal according to one sense and as a person (e.g., "pup") according to another sense. For each of the identified senses, the data source identifies other words that are part of the same sense. For example, the word "puppy" may be identified with "canine, carnivore, mammal, vertebrate, . . . animal." Similarly, the word "outdoors" may be identified with "beach, sand, soil, bay, sea, water, nature, scenery . . . coast."

After determining the related words using the data source, a parser may be used to select, filter, add, or limit the senses and or words that are associated with a particular class. For example, one or more senses may be removed from a particular class (e.g., limit the understanding of jaguar to "animal" instead of to both "animal" and "car"). Another KG representing cars may include the sense of "jaguar" as a car and not as an "animal". The parser may also be used to normalize the related words for the particular sense(s) selected. For example, the parser may modify (e.g., remove, add, edit) the related words received from the data source such that the words include the desired classes for objects identified within images. In some configurations, the parser modifies the tags to match existing tags that are used to identify objects within digital images.

After identifying the related words to initially use to generate the KG, the resulting words are provided to a sparse KG generator. The sparse KG generator creates a sparse KG that includes pairs of nodes with direct connections between the seed word and the other words. For example, in a sparse KG, the word "puppy" is directly connected with each of "canine, carnivore, mammal, vertebrate, animal," and the like. Each of these connections includes two nodes within the sparse KG.

The sparse KG may also have other nodes that have direct connections between other related words for the category that are different from the words determined from the data source. For example, "canine" (not determined using the data source) may be directly connected and paired with "animal" (determined from the data source). In some examples, a connection may be removed or added from the sparse KG. For instance, a word (e.g., cute) that was not associated with the seed word (e.g., puppy) may be added to the sparse KG. As another example, a connection may be removed from the sparse KG (e.g., remove the connection "puppy-vertebrate").

The sparse KG is used to create a KG. The KG is a tree structure created from the pairs of nodes in the sparse KG. The connection between the pair of words is used to generate a tree structure that identifies the relationships between the pairs of words included in the sparse KG. For example, each word connected to the seed word can become a child of the seed word, whereas a word connected to a child of the seed word becomes a grandchild node of the seed word. Words that are not connected to the seed word may become sibling nodes to the seed word. The created KG can have a large number of hierarchical levels. In some examples, a connection of the KG can be edited. For instance, a branch of KG may be moved, removed, or one or more nodes may be added or removed from the KG.

After generating the KG, a dense KG is created that includes the seed word directly connected to each of the other nodes in the KG. Instead of having many hierarchical levels, the dense KG may have just two levels. The first level of the seed word and the second level of each of the other nodes within the KG. For example, the dense KG for the seed word "puppy" may include connections to "canine, carnivore, mammal, vertebrate, animal" as well as other related words determined from the other edges and nodes in the sparse KG.

At this point, after creation of the dense KG, instead of having connections across many different levels of hierarchy or independent connections, direct connections are established between each of the related words and the seed word. In this way, a connection between the seed word and other related words may be easily determined. In some configurations, the strength of the connection between the related words may be identified. For example, more related words may have a higher value as compared to words that are not as strongly related. After creation of the dense KG, additional edits may be made to the dense KG. For example, an additional connection may be added to the dense KG, or a connection may be removed from the dense KG.

In some configurations, the dense KG is used by an image analysis service when inferring or identifying relationships between "tags" recognized within digital images. An image software product may be used to determine whether or not objects within an image are properly tagged. For instance, a user may determine that "jaguar" is misclassified as a car instead of being classified as an animal within an image. In some examples, a user or a tester may provide feedback that indicates that a tag is incorrect. This feedback is used to refine the generated dense KG. The feedback might be used at different points within the generation of the dense KG. For example, the feedback might be used by the knowledge parser, the sparse KG generator and/or after creation of the dense KG. This process might be repeated a number of times in order to define a better dense KG. In some configurations, a representation of the dense KGs associated with an image may be displayed to the user. Additional details regarding the various components and processes described above relating to the generation and refinement of knowledge graphs will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

FIG. 1 is a block diagram depicting an illustrative operating environment 100 in which a knowledge graph is generated and used with tagged images of a user. As illustrated in FIG. 1, the operating environment 100 includes one or more computing devices 102 in communication with a service provider network 104.

A user may interact with the service provider network 104 using a computing device, such as the computing device 102. The computing device 102 may be computer, such as a desktop or a mobile computing device (e.g., a tablet or smartphone computing device). In some configurations, the computing device 102 may be connected to a television or some other display device. For instance, the computing device may be a dongle device that connects to a port of a television.

In some examples, an application, such as an image software product 106 executing on the computing device 102 communicates with the service provider network 104. As used herein, the term "software product" may refer to software and/or software services. For example, a software product may be an application, a machine image, or software as a service ("SaaS"). The software product may be available from an electronic marketplace and may be executed on a customer computing device and/or within a service provider network or some other network. In other examples, the image software product 106 may be executed within the service provider network (not shown) on behalf of the user. For example, the software product 106, or some other software product 106, may be executed on computing resources provided by the service provider network 104. The user of computing device 102 may be a customer of the service provider network. As used herein, the terms "customer" and "customers" refer to existing customers of the service provider network 104 as well as visitors (i.e. potential customers) of the service provider network 104.

As described in more detail below, the service provider network 104 may include a collection of rapidly provisioned and, potentially, released computing resources hosted in connection with the electronic marketplace or a third party provider. The computing resources may include a number of computing, networking and storage devices in communication with one another. In some examples, the computing resources may correspond to physical computing devices. In other examples, the computing resources may correspond to virtual machine instances implemented by one or more physical computing devices. In still other examples, computing resources may correspond to both virtual machine instances and physical computing devices.

As illustrated, the service provider network 104 includes a knowledge graph service 116, an image analysis service 120, and a data store 122A. While the knowledge graph service 116, the image analysis service 120, and the data store 122A are illustrated within the service provider network 104, one or more of these services and data store may be located in other locations. For example, some or all of the functionality of the knowledge graph service 116 and/or the image analysis service 120 may be performed on the computing device 102 and/or on some other computing device.

According to some configurations, the image analysis service 120 analyzes the images 112 that are associated with a particular user. For example, the images 112 may be digital images that were taken by the user and/or shared with the user. In some examples, the images 112 for a user may be obtained in other ways. For example, from some other image source. In other configurations, the analysis of the images 112 may be performed on some other computing device, such as the computing device 102. The images 112 of a user may be stored on the data store 122B on the computing device 112, the data store 122A within the service provider network 104, and/or on some other image data source 112. For example, the other image source 124 may be a social media service (e.g., Facebook) or some other data store (e.g., Dropbox). In some examples, the images 112 may be obtained from video of the user (e.g., taken by a smartphone or camera of the user).

A digital image, such as one of the images 112, often includes a set of metadata (meaning data about the image). For example, a digital image 112 may include, but is not limited to the following metadata: title; subject; authors; date acquired; copyright; creation time—time and date when the image is taken; focal length (e.g., 4 mm); 35 mm focal length (e.g., 33); dimensions of the image; horizontal resolution; vertical resolution; bit depth (e.g., 24); color representation (e.g., sRGB); camera model (e.g., iPhone 6); F-stop; exposure time; ISO speed; brightness; size (e.g., 2.08 MB); GPS (Global Positioning System) latitude (e.g., 42; 8; 3.00000000000426); GPS longitude (e.g., 87; 54; 8.999999999912); and GPS altitude (e.g., 198.36673773987206). The GPS latitude, longitude and altitude may also be referred to as a GeoTag that identifies the geographical location (or geolocation for short) of the camera that took the picture and usually the objects within the image when the image is taken. A image or video with a GeoTag is said to be geotagged. In a different implementation, the GeoTag is one of the tags embedded in the image by the image analysis service 120 and/or some other component or computing device.

The images 112 can also include one or more tags embedded in the image, or possibly stored separately from the image, as metadata. The tags describe and indicate the characteristics of the image. For example, a "family" tag indicates that the image is a family image, a "wedding" tag indicates that the image is a wedding image, a "subset" tag indicates that the image is a sunset scene image, a "Santa Monica beach" tag indicates that the image is a taken at Santa Monica beach, etc. In some examples, each recognized item within the image may include a tag. There may be thousands of different tags. In some cases a user may modify and/or create tags. For example, user tags may be used to identify recognized individuals in the images 112, other tags may identify particular animals in the images 112, other tags may identify objects within the images (e.g., cars, buildings, tables, chairs).

In some examples, the image analysis service 120 may be configured to generate the tags from the images. In other examples, the image analysis service 120 extracts or retrieves the metadata and tags from each received or retrieved image. For example, a piece of software program code written in computer programming language C# can be used to read the metadata and tags from the images. In some configurations, the image analysis service 120 normalizes the tags of the retrieved images. For example, both "dusk" and "twilight" tags are changed to "sunset." The image analysis service 120 may also generate additional tags for each image. For example, a location tag is generated from the GeoTag in an image. In some examples, the image analysis service 120 sends the GPS coordinates within the GeoTag to a map service server requesting for a location corresponding to the GPS coordinates. For example, the location may be identifies as "Santa Monica Beach" or "O'Hare Airport." The name of the location is then regarded as a location tag for the image.

According to some configurations, the image analysis service 120 generates tags based on results of scene understanding and/or facial recognition that are performed on each image 112. For example, the image analysis service 120 may determine the scene type (such as beach, sunset, etc.) for each image 112 that is analyzed. The scene type determined by the image analysis service 120 may then be used as an additional tag (i.e., a scene tag) for the image 112. In some examples, the image creation time determined from the metadata associated with the image 112 may be used to assist scene understanding. For example, when the scene type is determined to be "beach" and the creation time is 6:00 PM for an image, both beach and sunset beach may be tags for the scene types of the image 112. As an additional example, a dusk scene image and a sunset scene image of a same location or structure may appear to be similar. In such a case, the image creation time helps to determine the scene type, i.e., a dusk scene or a sunset scene.

The date of the creation time and geolocation of the image may also be considered in determining the scene type. For example, the sun disappears out of sight from the sky at different times in different seasons of the year. Moreover, sunset times are different for different locations. Geolocation can further assist in scene understanding in other ways. For example, an image 112 of a big lake and an image 112 of a sea may look very similar. In such a case, the geolocations of the images may be used to distinguish a lake image from an ocean image.

The image analysis service 120 may also perform facial recognition to recognize faces and determine facial expressions of individuals within the images 112. In some examples, different facial images (such as smile, angry, etc.) are identified and used to create one or more emotion tags for the individual within the image. The image analysis service 120 may add one or more emotion tags (e.g., happy, sad, crying, laughing, smiling, frowning) to each image. For example, when the facial expression is smile for an image, the image analysis service 120 adds a "smile" tag to the image. The "smile" tag is a facial expression or emotion type tag.

The image analysis service 120 may also generate an event tag for special days and/or events. For example, when the creation time of the image is on a recognized holiday (e.g., July 4th or December 25$^{th}$), a "July 4th" tag or a "Christmas" tag may be generated by the image analysis service 120. The creation time might also be used to identify a special event for the user. For example, the event might be a birthday, a wedding, a graduation, or the like. In some configurations, the image analysis service 120 may access calendar data for the user (or other users recognized within the image 112) to determine whether that day is associated with an event identified by the user. In other examples, the image analysis service 120 may analyze the image 112 and determine that the image is associated with a particular event. For instance, the image analysis service 120 may recognize graduation hats and robes in the images 112 and determine that the image relates to a graduation. In this example, the image analysis service 120 may generate a "graduation" event tag.

In other configurations, the image analysis service 120 may receive tags entered and/or modified by a user. For example, the image analysis service 120 may provide a web page interface, such as user interface 136 that allows a user to tag an image by entering new tags and/or modify existing tags of the images 112. The tags associated with an image 112 may be stored within a data store, such as data store 122A and/or 122B. In other examples, the tags might be stored as part of the image file for the images 112.

According to some examples, the image analysis service 120 within the service provider network 104 may not have access to the images 112 of a user. For instance, the images 112 may be stored on the computing device 102. In this case, the image software product 106 might provide image data 114 to the image analysis service 120. The image data 114 might include metadata and tags for the images. In other cases, the image data 114 might be thumbnails for the images 112 that may be analyzed by the image analysis service 120. In yet other examples, the image data 114 might include other information about the images 112. In some configurations, the image analysis service 120 may maintain a unique identifier for each image that may be used to locate the metadata and tags of the corresponding image within the data store 122B, or some other location.

In some examples, the image analysis service 120 indexes the images using the generated tags and/or metadata. Furthermore, the images 112 may be categorized by scene types, such as a beach resort or a river. In some examples, the image analysis service 120 accesses social networking web page(s) of a user and analyzes the images 112 of the user that are included within the web pages(s).

As discussed in more detail below, the knowledge graph service 116 generates a dense knowledge graph (KG) 124. Generally, the dense KG 124 is used in conjunction with the tags and metadata 118A for the images 112 of a user when identifying the objects and concepts within an image. In many cases, the tags for an image 112 may be very close together in meaning. For example, a dog may be classified as an animal, a carnivore, a vertebrate, a mammal and the like. By creating the dense KG 124 to represent a classification for a dog, the different meanings or words used to classify a dog may be associated with direct connections. In this way, the concepts within an image might be more easily identified as compared to having similar tags that are not associated or traversing a KG that has many different hierarchical levels.

Initially, the knowledge graph service 116 accesses a structured data source (e.g., WORDNET, FREEBASE, DBPEDIA, BABELNET), to identify words that are related to a seed word (e.g., a category name). In some examples, the knowledge graph service 116 accesses a lexical database 118C(1)-118C(2) (e.g., WORDNET) to identify related words for a category. Alternatively, or in addition, the knowledge graph service 116 may access some other structured data source, such as FREEBASE, to identify related words to a category. In yet other cases, a user may provide additional words that are related to a particular category.

After determining the initial set of related words, the KG manager 130 may select, filter, add, or limit the senses and or words that are associated with a particular class. For example, one or more senses may be removed from a particular class (e.g., limit the understanding of jaguar to "animal" instead of to both "animal" and "car"). The KG manager 130 may also normalize the related words for the particular sense(s) selected. For example, the KG manager 130 may modify (e.g., remove, add, edit) the related words received from the data source such that the words include the desired classes for objects identified within images. In some configurations, the KG manager 130 modifies the tags to match existing tags that are used to identify objects within digital images.

After identifying the related words, the KG manager 130 generates the dense KG 124. In some cases, the KG manager 130 first creates a sparse KG (not shown) which may then be edited and then used to create an intermediary KG before creating the dense KG 124. The sparse KG includes pairs of nodes with direct connections between the seed word and the other words. The sparse KG is used by the KG manager 130 to create a KG. As discussed briefly above, the KG is a tree structure created from the pairs of nodes in the sparse KG. The connection between the pair of words identified by the sparse KG is used by the knowledge base service 116 to generate a tree structure that identifies the relationships between the pairs of words included in the sparse KG. For example, each word connected to the seed word can become a child of the seed word, whereas a word connected to a child of the seed word becomes a grandchild node of the seed word. In some examples, a connection of the KG can be edited. For instance, a branch of KG may be moved, removed, or one or more nodes may be added or removed from the KG.

After generating the KG, a dense KG is generated by the KG manager 130 that flattens the hierarchies of the KG. Instead of having many hierarchical levels, the dense KG can have two levels. The first level of the seed word and the second level of each of the other nodes within the KG. At this point, after creation of the dense KG 124, instead of having connections across many different levels of hierarchy or independent connections, direct connections are established between the seed word and each of the related words. In this way, a connection between the seed word and other related words may be easily determined. In some configurations, the strength of the connection between the related words may be identified. For example, words that are identified as being more related to the seed word may have a higher value as compared to words that are not as strongly related. After creation of the dense KG 124 by the KG manager 130, additional changes may be made to the dense KG. For example, an additional connection may be added to the dense KG, or a connection may be removed from the dense KG.

After creation of the KG 124 by the knowledge graph manager 130, or some other component or device, the knowledge graph manager 130 may generate a GUI that includes user interface ("UI") elements to represent the identified tags and a generated dense KG 124 to view. For instance, the GUI might include one or more user interface elements that allow a user to select a tag or a node in the dense KG 124 to select for editing. In some examples, the knowledge graph manager 130 provides the GUI for presentation in the user interface 136. In other examples, the image software product 106 may generate the GUI for presentation on a display, such as a display of the computing device 102.

Figure 2:
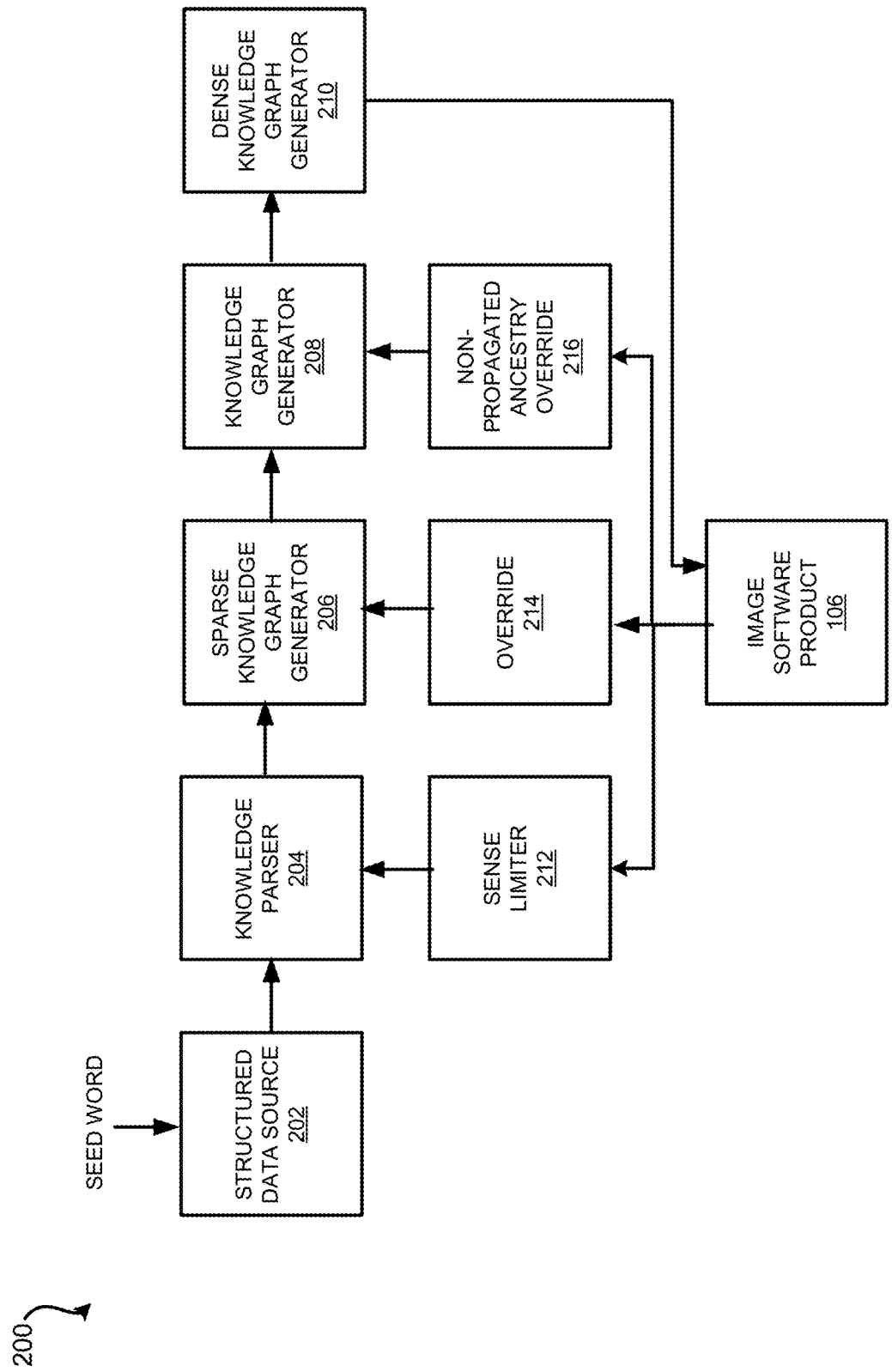
FIG. 2 is a block diagram showing a process for generating and refining a knowledge graph.
Figure 3:
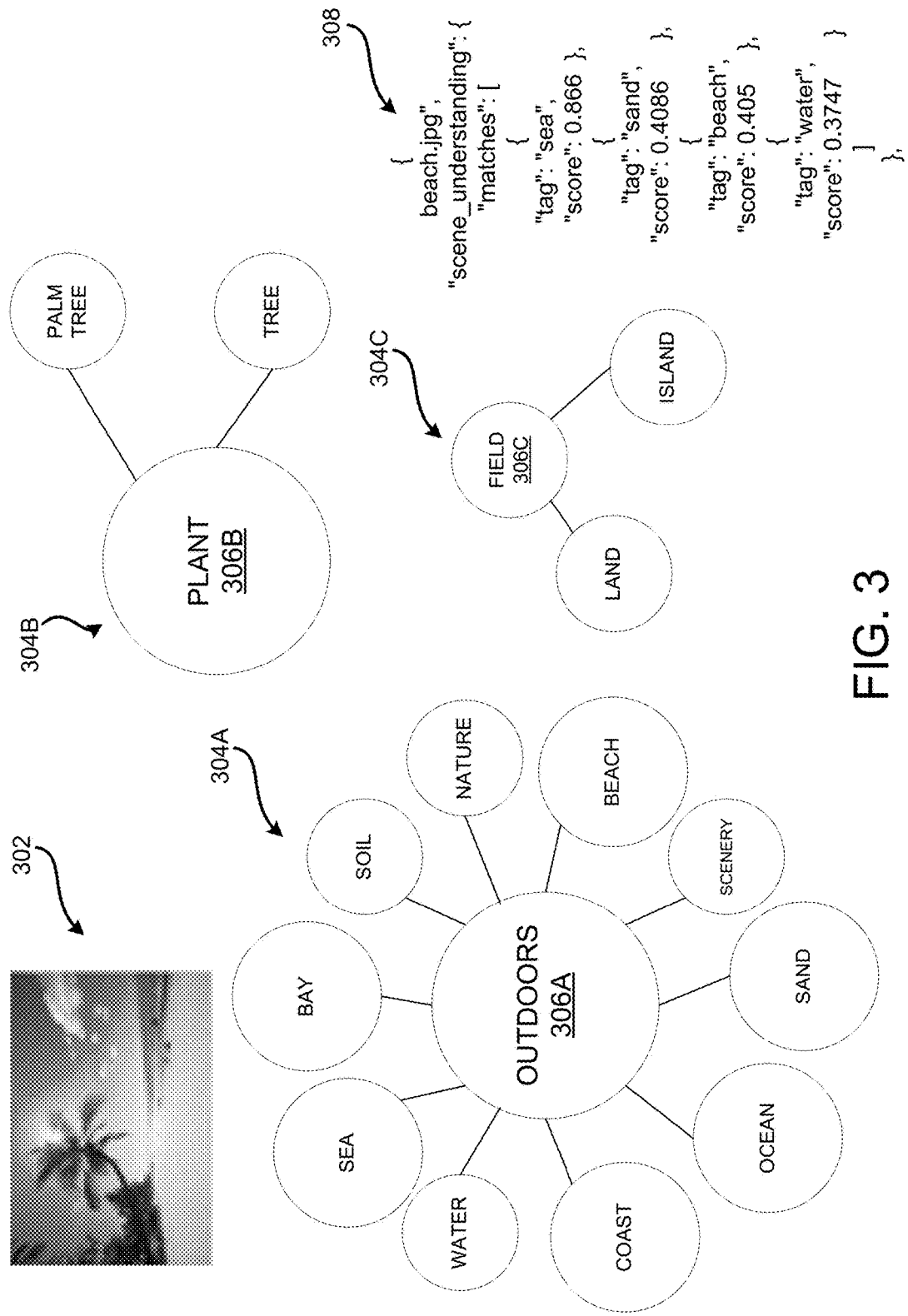
FIG. 3 is a block diagram showing an illustrative dense knowledge graph generated from an exemplary image.

After presentation of the GUI, the user may view the image and KG data 108 and determine whether or not objects within an image are properly tagged. For instance, is "jaguar" misclassified as a car instead of an animal within an image displayed on the user interface 136. In some examples, the user or a tester viewing the image and KG data 108 may provide feedback that indicates that a tag is incorrect. This feedback is used by the image analysis service 120 and/or the knowledge graph service 116 to refine the generated dense KG 124. FIG. 2 provides details regarding the process of creating and refining the dense KG 124 and FIG. 3 illustrates an exemplary display of dense KGs for a particular image.

For more details on generating tags and analyzing images, see applications, including U.S. patent application Ser. No. 14/074,575, entitled "SYSTEM AND METHOD FOR AUTOMATICALLY GENERATING ALBUMS" filed Nov. 7, 2013, U.S. patent application Ser. No. 14/074,594, entitled "SYSTEM, METHOD AND APPARATUS FOR SCENE RECOGNITION" filed Nov. 7, 2013, U.S. patent application Ser. No. 14/074,615, entitled "SYSTEM, METHOD AND APPARATUS FOR FACIAL RECOGNITION" filed Nov. 7, 2013, U.S. patent application Ser. No. 14/316,905, entitled "SYSTEM, METHOD AND APPARATUS FOR ORGANIZING PHOTOGRAPHS STORED ON A MOBILE COMPUTING DEVICE" filed Jun. 27, 2015, U.S. patent application Ser. No. 14/747,232, entitled "SYSTEM, METHOD AND APPARATUS FOR IMAGE SCENE RECOGNITION" filed Jun. 23, 2015, each of which is hereby incorporated by reference in its entirety, entitled "SYSTEM, METHOD AND APPARATUS FOR PERFORMING FACIAL RECOGNITION" filed Jun. 24, 2015, PCT Number PCT/US15/36637, entitled "SYSTEM, METHOD AND APPARATUS FOR ORGANIZING PHOTOGRAPHS STORED ON A MOBILE COMPUTING DEVICE" filed Jun. 19, 2015, U.S. Patent Application No. 61/724,628, entitled "SYSTEM, METHOD AND APPARATUS FOR SCENE RECOGNITION," filed Nov. 9, 2012, U.S. Patent Application No. 61/837,210, entitled "SYSTEM, METHOD AND APPARATUS FOR FACIAL RECOGNITION," filed Jun. 20, 2013, U.S. Patent Application No. 61/724,628, entitled "SYSTEM, METHOD AND APPARATUS FOR SCENE RECOGNITION," filed Nov. 9, 2012, U.S. Patent Application No. 61/837,210, entitled "SYSTEM, METHOD AND APPARATUS FOR FACIAL RECOGNITION," filed Jun. 20, 2013, each of which is hereby incorporated by reference in its entirety, which are commonly owned by AMAZON TECHNOLOGIES, INC.

FIG. 2 is a block diagram showing a process 200 for generating and refining a knowledge graph. The process 200 may be performed the KG manager 130 within the knowledge graph service 116, shown in FIG. 1, or some other component or computing device.

Initially, at 202, the KG manager 130 accesses a structured data source (e.g., WORDNET, FREEBASE, DBPEDIA, BABELNET), to identify words that are similarly grouped and express a distinct concept. For example, a lexical database, such as WORDNET, is accessed to determine related words to a seed word for the category. In some configurations, the data source may identify different "senses" for the same word. For example, the word "jaguar" may be identified as an animal according to one sense, and as a car according to another sense. As another example, the word "puppy" may be identified as an animal according to one sense and as a person (e.g., "pup") according to another sense. For each of the identified senses, the data source identifies other words that are part of the same sense. For example, the word "puppy" may be identified with "canine, carnivore, mammal, vertebrate, . . . animal." Similarly, the word "outdoors" may be identified with "beach, sand, soil, bay, sea, water, nature, scenery . . . coast."

After determining the related words using the data source, the related words may be provided to a parser, such as the knowledge parser 204 that may be used to select, filter, add, or limit the senses and or words that are associated with a particular class. For example, one or more senses may be removed from a particular class (e.g., limit the understanding of jaguar to "animal" instead of to both "animal" and "car") using the sense limiter 212. Another dense KG representing cars may include the sense of "jaguar" as a car and not as an "animal". The parser 204 may also be used to normalize the related words for the particular sense(s) selected. For example, the parser 204 may modify (e.g., remove, add, edit) the related words received from the data source such that the words include the desired classes for objects identified within images. In some configurations, the parser modifies the tags to match existing tags that are used to identify objects within digital images.

After identifying the related words to initially use to generate the dense KG, the resulting words are provided by the knowledge parser 204 to a sparse KG generator 206. The sparse KG generator 206 creates a sparse KG that includes pairs of nodes with direct connections between the seed word and the other words. For example, in a sparse KG, the word "puppy" is directly connected with each of "canine, carnivore, mammal, vertebrate, animal," and the like. The sparse KG may also have other nodes that have direct connections between other related words for the category that are different from the words determined from the data source. For example, "canine" (not determined using the data source) may be directly connected with "animal" (determined from the data source). In some examples, a connection may be removed or added from the sparse KG using override 214. For instance, a word (e.g., cute) that was not associated with the seed word (e.g., puppy) may be added to the sparse KG using the override 214. As another example, a connection may be removed from the sparse KG (e.g., remove the connection "puppy-vertebrate") using the override 214.

After creating the sparse KG, the sparse knowledge graph generator 206 provides the sparse KG to the KG generator 208 to create a KG. The connection between the pair of words identified by the sparse KG can be used by the knowledge base service 116 to generate a tree structure that identifies the relationships between the pairs of words included in the sparse KG. For example, each word connected to the seed word can become a child of the seed word, whereas a word connected to a child of the seed word becomes a grandchild node of the seed word. In some examples, a connection of the KG can be edited. For instance, a branch of KG may be moved, removed, or one or more nodes may be added or removed from the KG using the non-propagated ancestry override 216. The override is non-propagated since changes to the KG at this point are not further refined unless a subsequent pass is made to refine the dense KG 124.

After generating the KG, the dense KG generator 210 creates a dense KG that flattens the hierarchies of the KG generated by the knowledge graph generator 208. Instead of having many hierarchical levels, the dense KG can have two levels. The first level including the seed word and the second level including each of the other nodes within the KG. At this point, after creation of the dense KG 124, instead of having connections across many different levels of hierarchy or independent connections, direct connections are established between the seed word and each of the related words.

For example, the dense KG for the seed word "puppy" may include direct connections to "canine, carnivore, mammal, vertebrate, animal" as well as other related words determined from the other edges in the sparse KG. In this way, a relationship between two different words can be easily inferred and identified.

After creating the dense KG 124, the image software product 106 may be used by a tester, or some other user, to determine whether or not the dense KG 124 properly identifies the related words with the categories. As discussed above, the user might view an image along with the recognized tags and generated dense KG 124 on a GUI. The feedback received by the user may be used to refine the generated dense KG 124. The feedback might be used at different points within the generation of the KG. For example, the feedback might be used by the knowledge parser 204, the sparse KG generator 204, the knowledge graph generator 210 and/or after creation of the dense KG. The process 200 might be repeated a number of times in order to define the dense KG. In some configurations, a representation of the dense KGs associated with an image may be displayed to the user.

FIG. 3 is a block diagram showing an illustrative dense knowledge graph generated from an exemplary image. As illustrated, an image 302 of a beach is analyzed by the image analysis service 120 to identify tags within the image. The image analysis service 120 and/or the knowledge graph service 116 may associate the identified tags with nodes of one or more dense KGs 124 generated by the KG manager 130.

As illustrated, the image analysis service 120 identifies the objects within the image 302 and associates one or more tags with each of the identified objects. In the current example, the image analysis service 120 identifies the tags "bay, soil, nature, beach, scenery, sand, ocean, coast, water, sea, bay, palm tree, tree, land, and island" from objects within the image 302. In other examples, more or fewer tags can be identified by the image analysis service 120. After identifying the tags, the image analysis service 120, or some other component or device, can associate the tags with a dense KG 124 that has been generated by the knowledge graph service 116. In some configurations, the image analysis service 120 stores association data within the data store 122A that indicates that one or more tags match a child node of a dense KG 124 that has been generated. For example, if the tags a, b, and c of an image are determined to be a match to children of a particular dense knowledge graph, then the image analysis service 120 may store these associations within the data store 122A. In some examples, the image analysis service 120 generates a graph, such as graphs 304A-304C shown in FIG. 3, for each category and associated tags.

In some configurations, the image analysis service 120 can perform a search of generated dense KGs to determine an associated dense KG for each of the identified tags. Searching the generated dense KGs is quicker as compared to searching all of the different hierarchical levels of a KG that has not been flattened to generate a corresponding dense KG that includes a parent node for the category and direct nodes to represent the related words to the category.

According to some examples, the image analysis service 120 can access and search the knowledge graph data 118B stored within the data store 122A to identify the different categories depicted by the objects within the image 302. For instance, performing a search of the dense KG data for the tags "tree" or "palm tree" identifies the "plant" dense KG 124, performing a search for bay, soil, nature, beach, scenery, sand, ocean, coast, water, sea, or bay identifies the "outdoors" dense KG 124, and performing a search for land, or island identifies the "field" dense KG. As discussed herein, a dense KG can have thousands of nodes that associate related words with a particular category. Instead of having to traverse many different hierarchical levels to identify a particular category for an identified tag that can take a long time and require a lot of computing resources, the image analysis service 120 can search the dense KGs that include the related words directly connected to the category saving both time and computing resources. Accordingly, using the dense KGs and the association with tags in the image, images that are related to a particular category may be identified more quickly as compared to having to search and traverse knowledge graphs that have a large number of hierarchical levels. As another example, the identified dense KGs may be used to identify other possible tags that might be indicated by objects within the image. For instance, if the tag "dirt" was identified within an image, a related word such as "land" may be identified from the dense KG that includes the word "dirt" as a node of a dense KG 124. In some configurations, these possible other tags identified from one or more dense KGs 124 may be presented to the user to determine whether the identified related tags are applicable to an object within the image. As another example, the dense KGs 124 identified from the tags of the image may be used to locate images 112 that are similar to an image. For instance, the image analysis service 120 may locate the images 112 of a user that share the same dense KGs as the image. While the identified images may or may not include the same tags, the tags of the other images will be related to the same categories.

In the current example, three different graphs are shown that relate or associate the tags of the image 302 using the generated dense KGs 124. More or fewer graphs may be shown. Graph 304A shows an outdoors category 306A that includes tags identified within the image and included within a generated dense knowledge graph 124 for the outdoors category 304A. In the current example, the outdoors category 306A includes an identification of "bay, soil, nature, beach, scenery, sand, ocean, coast, water, and sea." The plant category 306B graph shows a classification of "tree and palm tree". The field category 306C graph includes "land and island".

The display element 308 shows a portion of an exemplary listing of tags and their association with the outdoors category 306A. In the current example, the display element 308 shows that the sea identification has a rating or confidence level of 0.866 (out of 1), whereas the sand identification has a 0.4086 rating, the beach identification has a rating of 0.405 and the water identification has a rating of 0.3747. As discussed above, a user, such as a tester or user of the image software product 106 may make modifications to the tags and/or the graphs 304A-304C that may then be used by the KG manager 130 to update the affected KGs 124.

Figure 4:
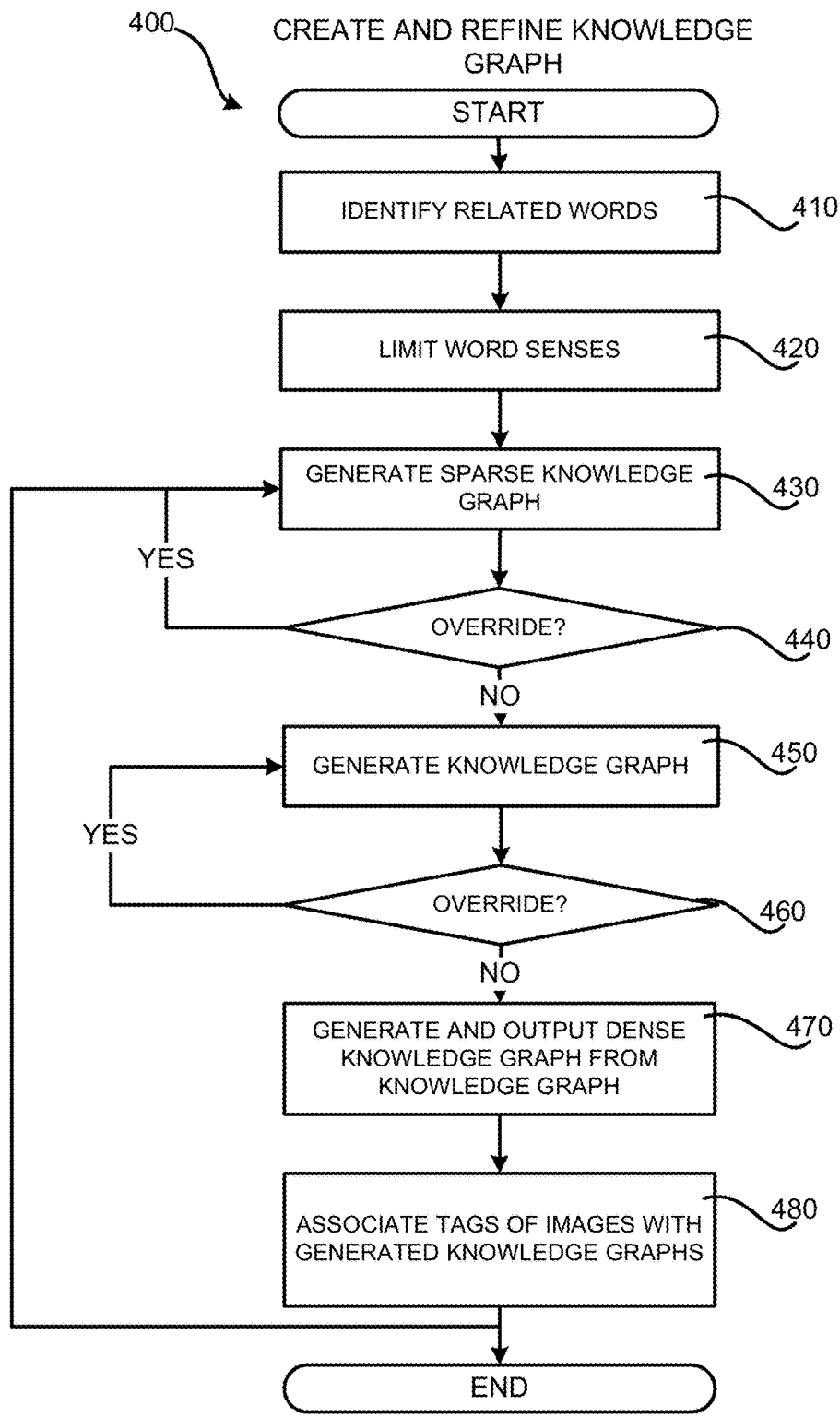
FIG. 4 is a flow diagram showing a routine illustrating aspects of a mechanism disclosed herein for generating and refining a dense knowledge graph.

FIG. 4 is a flow diagram showing a routine 400 that illustrate aspects of a mechanism for generating and refining a dense knowledge graph. It should be appreciated that the logical operations described herein with respect to FIG. 4, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

The routine 400 may begin at 410, where related words are identified. As discussed above, the KG manager 130 may access a lexical database and/or some other structured data source to identify similar words to a category. In some examples, a user may provide additional words and/or edit the words determined to be similar to match existing tags utilized by the image analysis service 120.

At 420, the word senses may be limited. As discussed above, one word may have more than one sense. In many cases, identifying a word as two different senses for a particular category would not make sense. For example, "jaguar" may mean an animal in one sense and a car in another sense. According to some configurations, a user may select the sense that matches the dense KG 124 being generated.

At 430, a sparse knowledge graph is generated. As discussed above, the sparse KG includes nodes with direct connections between the seed word and the other words. At this point, the sparse KG does not directly connect the different nodes that form the dense KG 124.

At 440, a decision may be made to override one or more of the connections represented in the sparse KG. As discussed above, a user might add a connection, delete a connection, or edit a connection. When a decision is made to override one or more of the determinations, the process returns to operation 430. When an override does not occur, the process 400 flows to 450.

At 450, a KG is generated. As discussed above, the KG is a tree structure that is generated by the KG manager 130 that identifies the relationships between the pairs of nodes identified in the sparse KG.

At 460, a decision may be made to override one or more of the connections represented in the KG. As discussed above, a user might add a connection, delete a connection, or edit a connection. When a decision is made to override one or more of the determinations, the process returns to operation 450. When an override does not occur, the process 400 flows to 470.

At 470, the dense KG 124 is generated and output. As discussed above, the dense KG 124 includes the seed words directly connected to each of the different words directly with the seed word for the category. In some configurations, the dense KG 124 might be stored within a data store and/or presented to a user. For example, a user may view the connections within the dense KG 124 to determine any changes that should be made to the dense KG 124.

At 480, the tags of images 112 (e.g., the user images) are associated with one or more the generated dense KGs 124. As discussed above, the association of the tags identified from objects depicted within the images 112 may assist in identifying related images 112 of a user. As also discussed above, after the image analysis service 120 tags the identified objects within the image 302, the image analysis service 120, or some other component or device, can associate the tags with one or more of the generated dense KGs 124. Generally, each of the identified tags will be associated with a particular category as represented by a particular dense KG 124.

To determine the category to which a tag belongs, the image analysis service 120 can perform a search of generated KGs to determine an associated dense KG for each of the identified tags within the user images 112. According to some examples, the image analysis service 120 can access and search the knowledge graph data 118B stored within the data store 122A to identify the different categories associated with the tags identified from the user images 112. For instance, the image analysis service 120 can perform a search of the dense KGs included within the knowledge graph data 118B for each of the identified tags to identify the categories associated with the tags. Instead of having to traverse many different hierarchical levels to identify a particular category for an identified tag, the image analysis service 120 can search a single hierarchical level of the dense KGs to identify the category associated with a particular tag, thereby saving both time and computing resources. After identifying the categories identified by the tags of an image, the image analysis service 120 can store the associated category information with information for each of the tags depicted within an image. In some configurations, the image analysis service 120 stores association data within the data store 122A that indicates that one or more tags of the image match a child node of a dense KG 124 that has been generated. For example, if five tags of an image are determined to be a match to children of a first dense knowledge graph, then the image analysis service 120 may store data indicating the associations between the five tags of the image and the category represented by the first dense knowledge graph. Similarly, if two tags of the image are determined to be a match to children of a second dense knowledge graph, then the image analysis service 120 may store data indicating the associations between the two tags of the image and the category represented by the second dense knowledge graph. In some examples, the image analysis service 120 generates a graph, such as graphs 304A-304C shown in FIG. 3, for each category and associated tags.

Accordingly, using the dense KGs and the association with tags in the image to dense KGs, images that are related to a particular category may be identified more quickly as compared to having to search and traverse knowledge graphs that have a large number of hierarchical levels. The identified dense KGs can also be used to identify other possible tags that might be indicated by objects within the image but are not yet associated with the image. For instance, if the tag "water" was identified within an image, related words such as "lake", "pond", "ocean" may be identified from the dense KG that includes the word "water" as a node of a dense KG 124. In some configurations, these possible other tags identified from one or more dense KGs 124 may be presented to the user to determine whether the identified related tags are applicable to an object within the image. As another example, the dense KGs 124 identified from the tags of the image may be used to locate similar images. For instance, the image analysis service 120 may locate the images 112 of a user that share the same dense KGs as the image. While the identified images may or may not include the same tags, the tags of the other images will be related to the same categories. The routine 400 may then proceed to an end operation. Alternately, the routine 400 might proceed back to repeat some or all of the processing operations described above. For example, from 480, routine 400 may proceed back to 430.

Figure 5:
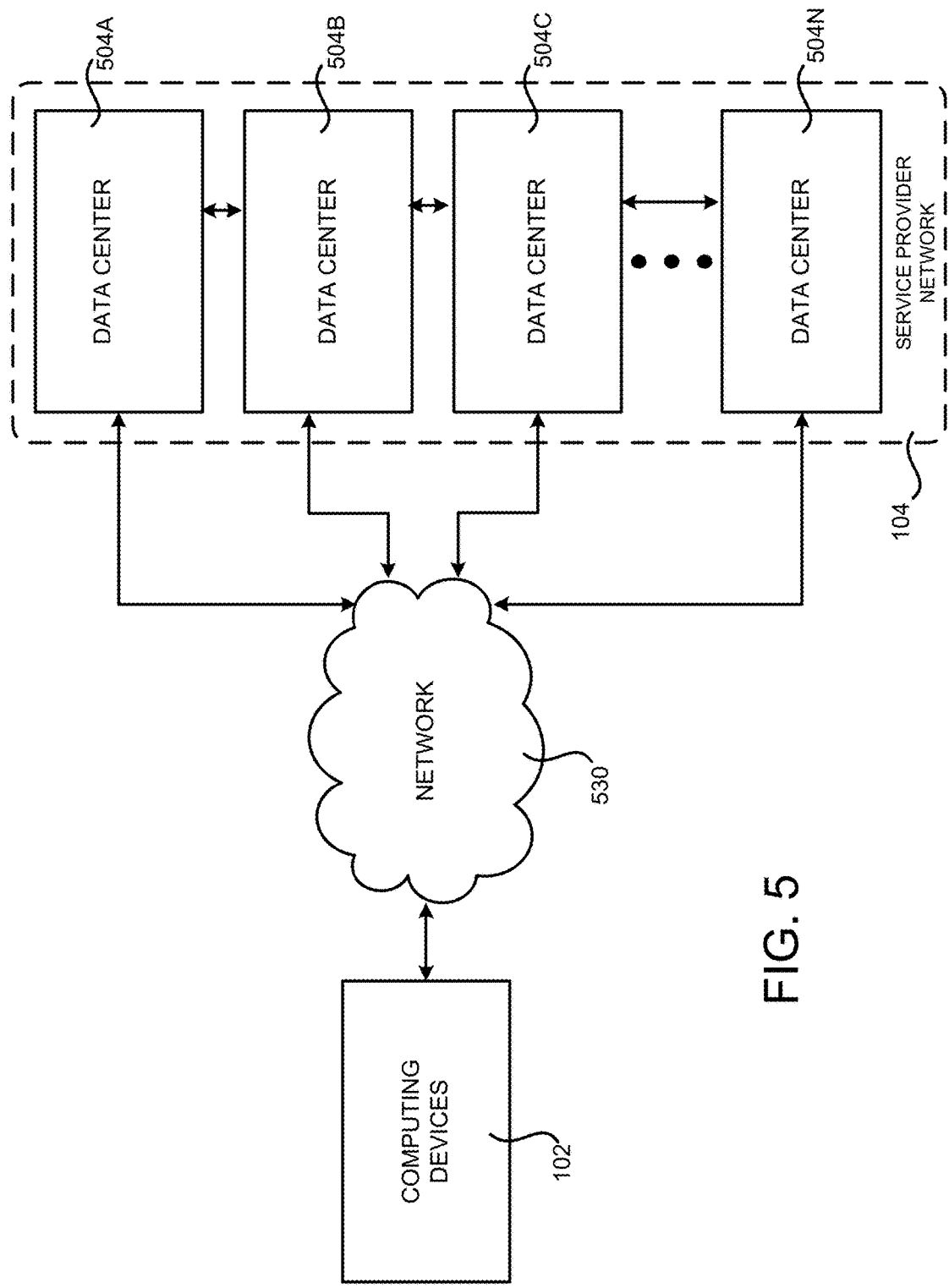
FIG. 5 is a system and network diagram that shows one illustrative operating environment for the examples disclosed herein that includes a service provider network.

FIG. 5 and the following description are intended to provide a brief, general description of a suitable computing environment in which the examples described herein may be implemented. In particular, FIG. 5 is a system and network diagram that shows an illustrative operating environment that includes a service provider network 104. As discussed above, the service provider network 104 can provide virtual machine instances and computing resources on a permanent or an as-needed basis.

The computing resources provided by the service provider network 104 may include various types of resources, such as data processing resources, data storage resources, networking resources, data communication resources and the like. Each type of computing resource may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 104 are enabled in one implementation by one or more data centers 504A-504N (which may be referred to herein singularly as "a data center 504" or collectively as "the data centers 504"). The data centers 504 are facilities utilized to house and operate computer systems and associated components. The data centers 504 typically include redundant and backup power, communications, cooling and security systems. The data centers 504 might also be located in geographically disparate locations. One illustrative configuration for a data center 504 that implements some or all of the concepts and technologies disclosed herein for annotating resources in the service provider network 104 will be described below with regard to FIG. 6.

The users and customers of the service provider network 104 may access the computing resources provided by the data centers 504 over a suitable data communications network, such as a Wide Area Network ("WAN"), as illustrated by network 530. Although a WAN might be used, it should be appreciated that a local-area network ("LAN"), the Internet, or any other networking topology known in the art that connects the data centers 504 to the computing devices 102 may be utilized. It should also be appreciated that combinations of such networks might also be utilized.

Figure 6:
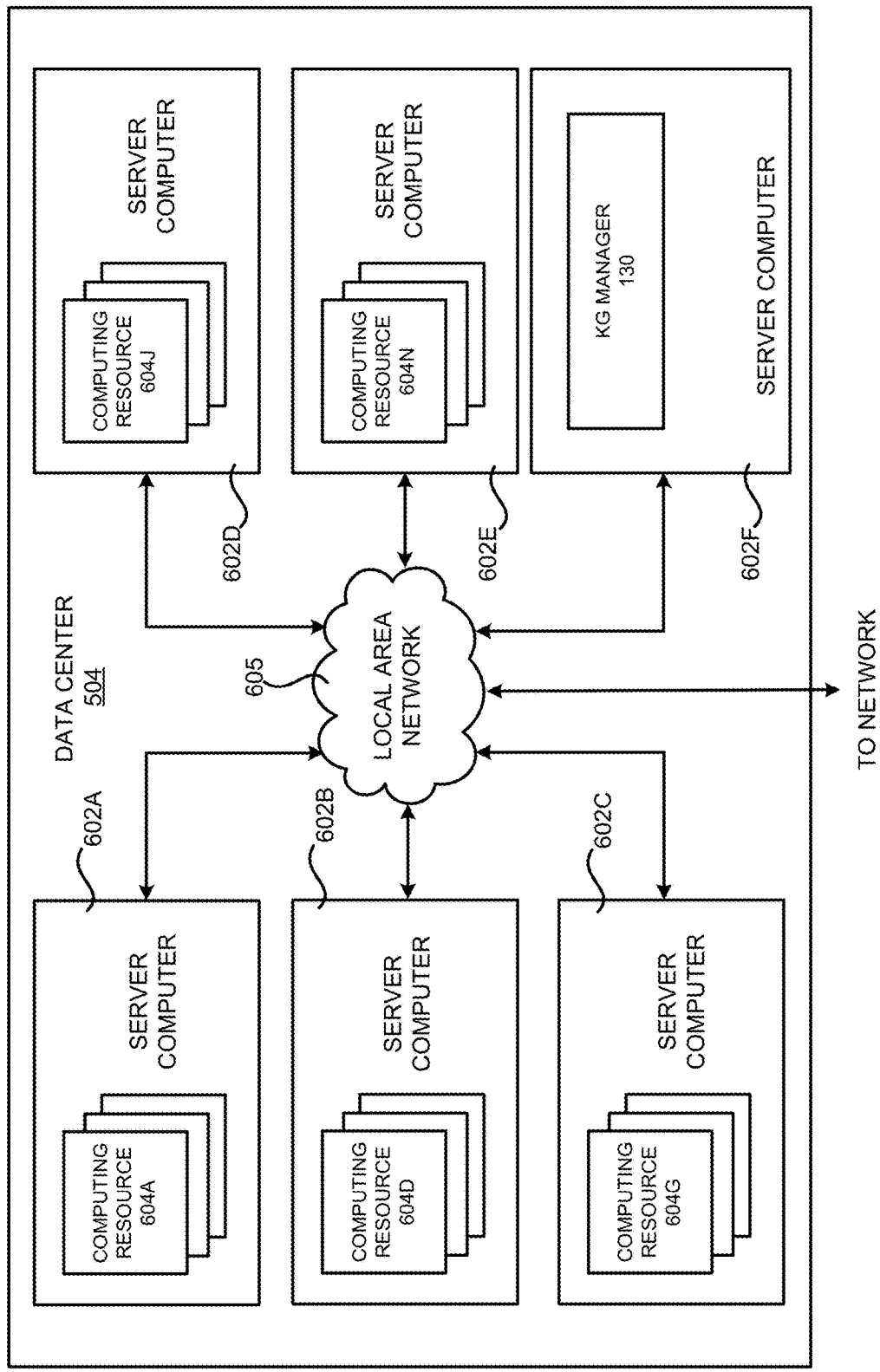
FIG. 6 is a computing system diagram that illustrates one configuration for a data center that implements aspects of a service provider network, including some or all of the concepts and technologies disclosed herein for generating and refining a knowledge graph.

FIG. 6 is a computing system diagram that illustrates one configuration for a data center 504 that implements aspects of a service provider network 104, including some or all of the concepts and technologies disclosed herein for generating and refining a knowledge graph. The example data center 504 shown in FIG. 6 includes several server computers 602A-602F (which may be referred to herein singularly as "a server computer 602" or in the plural as "the server computers 602") for providing computing resources. The server computers 602 may be standard tower or rack-mount server computers configured appropriately for providing the computing resources described herein. According to an example, the server computers 602 are configured to execute the software products as described above.

In one example, some of the computing resources 604 are virtual machine instances. As known in the art, a virtual machine instance is an instance of a software implementation of a machine (i.e. a computer) that executes programs like a physical machine. Each of the server computers 602 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 602, for example.

The data center 504 shown in FIG. 6 also includes a server computer 602F reserved for executing software components for managing the operation of the data center 504, the server computers 602, virtual machine instances, and other resources within the service provider network 104. The server computer 602F might also execute the knowledge graph manager 130. Details regarding the operation of each of these components has been provided above. In this regard, it should be appreciated that while these components are illustrated as executing within the service provider network 104, computing systems that are external to the service provider network 104 might also be utilized to execute some or all of these components. Other configurations might also be utilized.

In the example data center 504 shown in FIG. 6, an appropriate local area network ("LAN") 605 is utilized to interconnect the server computers 602A-602E and the server computer 602F. The LAN 605 is also connected to the network 530 illustrated in FIG. 5. It should be appreciated that the configuration and network topology illustrated in FIGS. 5 and 6 has been greatly simplified and that many more computing systems, networks and networking devices may be utilized to interconnect the various computing systems disclosed herein. Appropriate load balancing devices or software modules might also be utilized for balancing a load between each of the data centers 504A-504N, between each of the server computers 602A-602F in each data center 504 and between virtual machine instances and other types of computing resources provided by the service provider network 104.

It should be appreciated that the data center 504 described in FIG. 6 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 7:
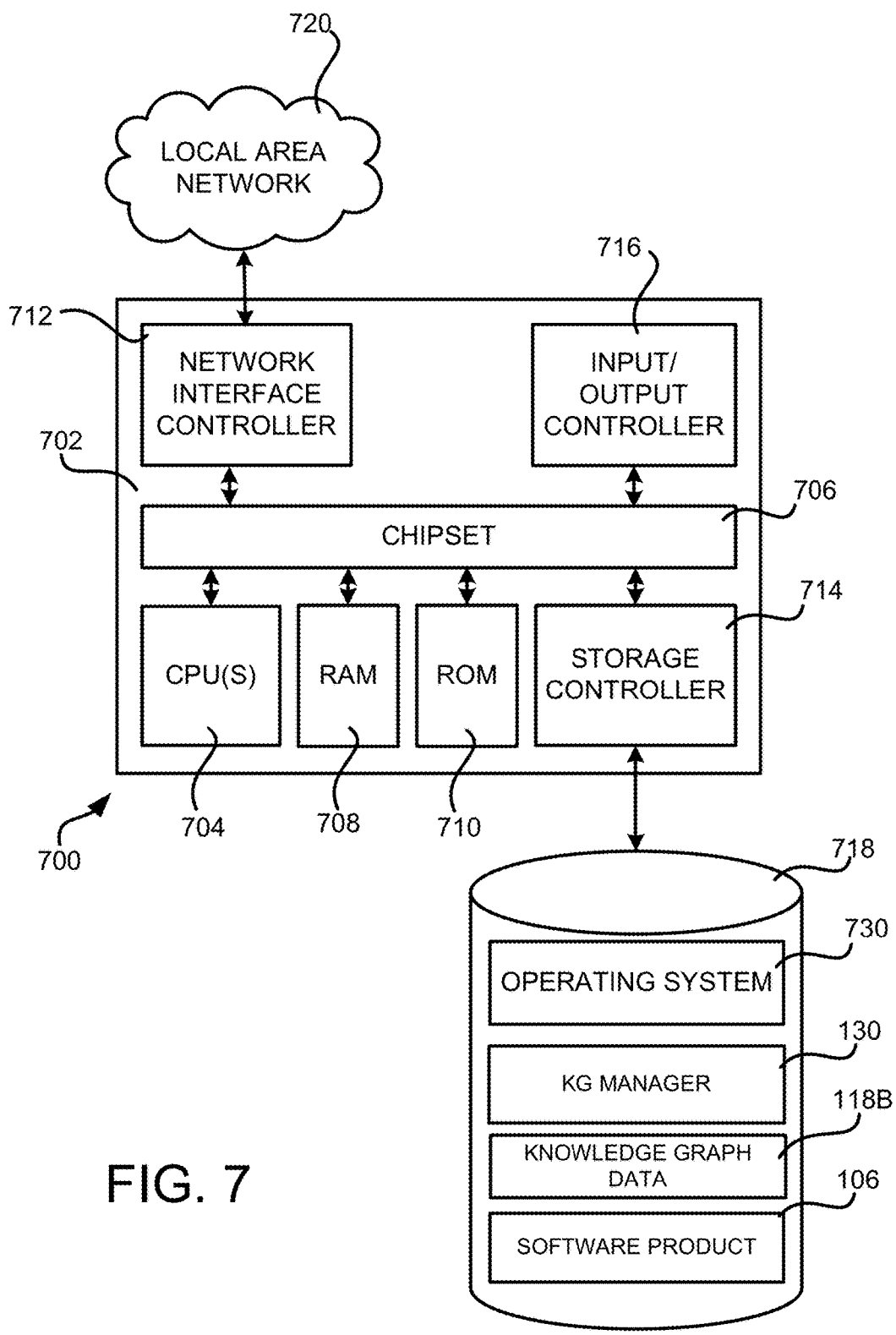
FIG. 7 is a computer architecture diagram showing one illustrative computer hardware architecture for implementing a computing device that might be utilized to implement aspects of the various examples presented herein.

FIG. 7 shows an example computer architecture for a computer 700 capable of executing program components for generating and revising a knowledge graph in the manner described above. The computer architecture shown in FIG. 7 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 7 may be utilized to execute software components for performing operations as described above. The computer architecture shown in FIG. 7 might also be utilized to implement a computing device 102 or any other of the computing systems described herein.

The computer 700 includes a baseboard 702, or "motherboard," which is a printed circuit board to which a multitude of components or devices may be connected by way of a system bus or other electrical communication paths. In one illustrative example, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the examples described herein.

The computer 700 may operate in a networked environment using logical connections to remote computing devices and computer systems through a network, such as the local area network 720. The chipset 706 may include functionality for providing network connectivity through a network interface controller ("NIC") 712, such as a gigabit Ethernet adapter. The NIC 712 is capable of connecting the computer 700 to other computing devices over the local area network 720. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one example, the operating system comprises the LINUX operating system. According to another example, the operating system comprises the WINDOWS® SERVER operating system from MICROSOFT Corporation. According to further examples, the operating system may comprise the UNIX operating system. It should be appreciated that other operating systems may also be utilized. The mass storage device 718 may store other system or application programs and data utilized by the computer 700, such as components that include the knowledge graph manager 130, the software product 106 and/or any of the other software components and data described above. The mass storage device 718 might also store other programs and data not specifically identified herein.

In one example, the mass storage device 718 or other computer-readable storage media is encoded with computer-executable instructions that, when loaded into the computer 700, transform the computer into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the routine 400 described above with regard to FIG. 4. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for generating and refining a knowledge graph have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
   receive, from a structured data source, related words to a seed word that represents a category;
   identify different senses for the seed word using the related words received from the structured data source, wherein a first sense of a first related word has a first meaning and a second sense of the first related word has a second meaning;
   limit a number of the different senses, wherein limiting the number of the different senses reduces a number of the related words;
   generate a sparse knowledge graph (KG), the sparse KG including a plurality of pairs of independent connections between the seed word and the related words;
   generate a KG from the related words and the seed word, the KG including a first node at a first hierarchical level that is directly connected to the seed word, and a second node at a second hierarchical level that is a child of the first node;
   generate a dense KG from the related words and the seed word, the dense KG including direct connections between the seed word and each of the individual ones of the related words, wherein generating the dense KG includes changing the connection of the second node to directly connect to the seed word;
   obtain tags for an image, the tags identify one or more of objects within the image, individuals within the image, or scenes within the image;
   generate an association between at least a portion of the tags and one or more of the dense KG or a second dense KG; and
   utilize the association to identify one or more other images.

2. The non-transitory computer-readable storage medium of claim 1, wherein the computer-executable instructions further cause the computer to add a connection within the sparse KG or remove a connection within the sparse KG.

3. The non-transitory computer-readable storage medium of claim 1, wherein the computer-executable instructions further cause the computer to refine the dense KG based, at least in part, on tags modified by a user.

4. The non-transitory computer-readable storage medium of claim 1, wherein the data source is one or more of a lexical database or a structured database.

5. A system, comprising:
   one or more computing devices including one or more processors performing operations to
      receive, from a data source, related words to a seed word;
      limit a number of senses identified from the related words, wherein a first sense of a first related word has a first meaning and a second sense of the first related word has a second meaning;
      generate a sparse knowledge graph (KG), the sparse KG including a plurality of pairs of independent connections between the seed word and the related words;
      generate a KG from the related words and the seed word, the KG including a first node at a first hierarchical level that is directly connected to the seed word, and a second node at a second hierarchical level that is a child of the first node;
      generate a dense KG from the related words and the seed word, the dense KG including direct connections between the seed word and each of the individual ones of the related words, wherein generating the dense KG includes changing the connection of the second node to directly connect to the seed word;
      generate an association between tags associated with an image and one or more of the dense KG or a second dense KG; and
      provide for display, a representation of the association between at least a portion of the tags and one or more of the dense KG or the second dense KG.

6. The system of claim 5, wherein limiting the number of senses identified from the related words comprises limiting the number of senses to a single sense.

7. The system of claim 5, wherein the one or more computing devices perform further operations to add a connection within the sparse KG or remove a connection within the sparse KG.

8. The system of claim 7, wherein add the connection within the sparse KG or remove the connection within the sparse KG occurs, at least partly, in response to receipt of a user input.

9. The system of claim 5, wherein the one or more computing devices perform further operations to identify a tag associated with an image modified by the user, and refine the dense KG based at least in part on the tag modified by the user.

10. The system of claim 5, wherein the data source is a lexical database.

11. The system of claim 5, wherein the one or more computing devices perform further operations to identify the tags associated with the image and to store, within a data store, metadata defining the relationship between the tags and the dense KG.

12. A computer-implemented method, comprising:
    receiving, from one or more data sources, related words to a seed word;
    limiting a number of senses identified from the related words, wherein a first sense of a first related word has a first meaning and a second sense of a first related word has a second meaning;

generating a sparse knowledge graph (KG), the sparse KG including a plurality of pairs of independent connections between the seed word and the related words;

generating a KG from the related words and the seed word, the KG including a first node at a first hierarchical level that is directly connected to the seed word, and a second node at a second hierarchical level that is a child of the first node;

generating a dense knowledge graph (KG) from the related words and the seed word, the dense KG including direct connections between the seed word and each of the individual ones of the related words, wherein generating the dense KG includes changing the connection of the second node to directly connect to the seed word;

generating an association between tags associated with an image and one or more of the dense KG or a second dense KG; and providing for display, a representation of the association between at least a portion of the tags and one or more of the dense KG or the second dense KG.

13. The computer-implemented method of claim 12, further comprising receiving a change to the sparse KG, wherein the change indicates one or more of adding a connection within the sparse KG or removing a connection within the sparse KG.

14. The computer-implemented method of claim 12, further comprising:

receiving input indicating a change to the dense KG;

updating the dense KG to reflect the change; and returning, to a user computing device, an indication of images related to a specified category.

* * * * *